Figure 1:
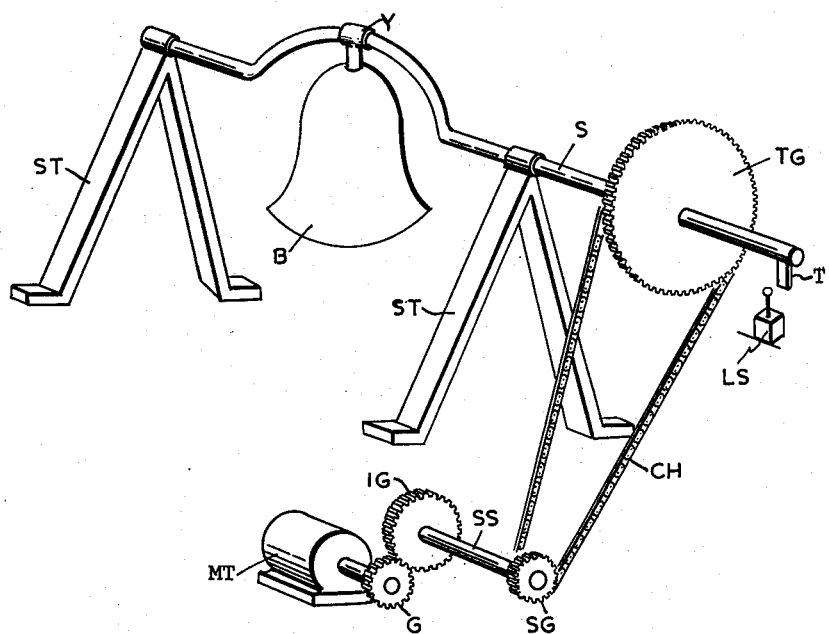

Sept. 3, 1963

F. M. BAILEY 3,102,975

PENDULUM DRIVING AND DRIVEN SINGLE PHASE
MOTOR INERTIA CONTROL DEVICE

Filed Aug. 29, 1961

*INVENTOR.*
FRANCIS M. BAILEY
BY
John B. Sponsler

United States Patent Office 3,102,975
Patented Sept. 3, 1963

3,102,975
PENDULUM DRIVING AND DRIVEN SINGLE PHASE MOTOR INERTIA CONTROL DEVICE
Francis M. Bailey, Roanoke, Va., assignor to General Electric Company, a corporation of New York
Filed Aug. 29, 1961, Ser. No. 134,705
2 Claims. (Cl. 318—281)

This invention relates to overcoming inertia of a predetermined mass by means sufficient only to overcome partially the inertia of the aforesaid mass in apparatus containing oscillating loads and the like. More particularly the invention is concerned with operating a heavy pendulum, or the like, by a driving agency initially having insufficient power to swing the pendulum through its normal operating displacement. However, the teaching of this invention permits an oscillating load of substantial inertia to be successfully operated upon by a driving force of relatively insignificant capacity.

It is an object of this invention, therefore, to provide a control system or device wherein the inertia of an oscillating load may be effectively overcome by a proportionately meager driving force.

The invention is taught in its simplest embodiment by utilization in ringing a heavy bell such as a church bell, making use of the inherent characteristics of an alternating current induction motor. For example, let it be assumed that a heavy bell suspended upon a shaft is to be oscillated on the shaft by an alternating current motor connected mechanically to rotate the shaft and that the motor has the capacity only to rotate the shaft partially before stalling. When electrical energy is applied to the motor the torque developed by the motor tends to rotate the shaft by an amount less than 180 degrees, the motor stalling when the inertia of the bell is no longer overcome, and thereafter the pendulous swing of the bell reverses, turning the motor's shaft in the opposite direction, until such time as the speed of rotation is such that the motor again provides torque in the reverse direction. This continues until the inertia of the bell exceeds the torque of the motor in the new direction, whereupon the motor stalls again, and the process is repeated. This mode of operation continues as long as electrical energy is supplied to the motor, the amplitude of the swing of the bell increasing until the forces required to maintain oscillation are equal to the forces developed by the torque of the motor.

It is a further object of the invention to provide a control system wherein the amplitude of an oscillating load is built up progressively by a driving force incapable of initially operating at that amplitude.

The novel features of the invention are set forth with particularity in the appended claims. The invention itself, however, both as to its organization and method of operation, together with further objects and advantages thereof, may best be understood by referring to the following description and the accompanying drawings.

Figure 2:
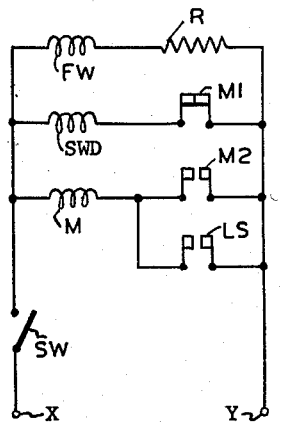

In the drawings, FIG. 1 is a diagrammatic view of the structure of my bell ringing device, and FIG. 2 is a circuit diagram of the same.

In the drawing FIG. 1 illustrates an oscillating load as represented by a bell B connected by a yoke Y to a shaft S supported and journaled in the stands ST, the shaft S having a gear TG attached whereby the shaft is rotated. A chain CH is connected from another gear SG to the gear TG, the former gear being fixed to an idler shaft SS which is geared to a motor MT via the gears 1G and G. At one extremity of the shaft S there is a fixed tab T which coacts with a limit switch LS whenever the shaft S is rotated more than a few degrees in either direction to momentarily close an electrical circuit.

FIG. 2 is an electrical circuit governing the operation of the motor MT from a source of alternating current impressed across its terminals X and Y. For example, when a switch SW is closed potential will be applied to a starting winding SWD of the motor MT, and the motor will rotate thereby turning the shaft S via the gears G, 1G, SG and TG, the shaft SS and the chain CH. At first the motor MT will be energized by its starting winding SWD, as well as by its field winding FW, through the normally closed relay contacts M1. When the shaft S is rotated a few degrees, however, the tab T operates the limit switch LS, which is so arranged that its contacts are closed only when contacted or engaged by the tab T, picking up relay M thereby closing the relay holding contacts M2 and opening the starting winding SWD circuit via relay contacts M1.

Thereafter the motor MT remains energized through its field winding FW until the switch SW is opened. The torque developed by motor MT is opposed, however, by the inertia of the mechanical system including the bell B, and since the motor MT is chosen to have insufficient capacity to rotate shaft S initially more than a few degrees whereupon the motor torque falls off, the motor stalls, and is finally driven in reverse by the inertia of the system until the motor again picks up sufficient speed to provide torque in the opposite direction. Thereafter the motor MT again reaches a stalling point due to the inertia of the system, and the cycle is repeated, the amplitude of swing of the bell B, or rotation of the shaft S, increasing to a maximum dependent upon the stabilization of the motor torque and the system's inertia. As a result a substantially heavy oscillating load can be handled by a motivating force of relatively small capacity, and although the embodiment shown is applied to ringing a heavy bell; nevertheless, adaptation of this novel concept to its utilization in such devices as swinging shears, earth moving apparatus and the like, is quite apparent.

While this invention has been explained and described with the aid of a particular embodiment thereof, it will be understood that the invention is not limited thereby and that many modifications will occur to those skilled in the art. It is therefore contemplated by the appended claims to cover all such modifications as fall within the scope and spirit of the invention.

What is claimed is:

1. Apparatus for oscillating a pendulum to a predetermined amplitude comprising an alternating current, single phase motor having insufficient capacity to initially move said pendulum to said amplitude, a mechanical connection from said motor to said pendulum, and means for energizing said motor to control the movement of said pendulum in a predetermined direction until said motor stalling point is reached and thereafter to move said pendulum in the opposite direction until said stalling point is again reached.

2. Apparatus for imparting harmonic motion to a mass attached to and suspended from a shaft including an alternating current, single phase motor having insufficient torque to initially overcome the inertia of the pendulum formed by the said mass and shaft, means for energizing said motor to rotate in a predetermined direction, connections between said motor and said shaft for mutual rotation, and means for continuing energization of said motor to rotate to a stalling point governed by the said inertia whereby the direction of rotation of said motor is repetitively reversed.

References Cited in the file of this patent
UNITED STATES PATENTS

| 1,202,446 | Speed | Oct. 24, 1916 |
| 2,769,946 | Brailsford | Nov. 6, 1956 |

FOREIGN PATENTS

| 313,978 | Great Britain | Jan. 21, 1929 |